United States Patent [19]

Satchell, Jr.

[11] 4,298,466

[45] Nov. 3, 1981

[54] APPARATUS AND METHOD FOR VISUALLY MONITORING AN ION EXCHANGE FLUIDIZED BED

[75] Inventor: Donald P. Satchell, Jr., Clifton, Ariz.

[73] Assignee: Phelps Dodge Corporation, New York, N.Y.

[21] Appl. No.: 110,839

[22] Filed: Jan. 10, 1980

[51] Int. Cl.³ .................... B01D 35/14; B01J 8/20
[52] U.S. Cl. .................................. 210/94; 73/323; 34/57 A; 210/136; 422/140
[58] Field of Search .................... 210/94, 95; 422/139, 422/140, 141, 142; 34/88, 57 A; 73/328, 327, 323

[56] References Cited

U.S. PATENT DOCUMENTS

| | | | |
|---|---|---|---|
| 545,765 | 8/1895 | Reed et al. | 73/328 |
| 574,765 | 1/1897 | Semans | 73/328 |
| 756,134 | 3/1904 | Neeley | 73/328 |
| 1,077,758 | 11/1913 | Salter | 73/328 |
| 1,110,474 | 9/1914 | Bagley | 73/328 |
| 1,605,226 | 11/1926 | Fricke, Sr. et al. | 73/328 |
| 1,875,779 | 9/1932 | Thomson | 73/328 |
| 4,108,000 | 8/1978 | Norris | 73/328 |
| 4,115,070 | 9/1978 | Jukkola et al. | 422/142 |

OTHER PUBLICATIONS

Greer et al., New Ion Exchange Resin for Uranium Recovery, Ind. & Eng. Chem., vol. 50, No. 2, Feb. 1958.
Byproduct Uranium Recovered with New Ion Exchange Tech., George et al., Mining Engin. 1968.
The Extractive Metallurgy of Uranium, Merritt, Col. School of Mines Research Inst., Chapter 6, pp. 132-182.

*Primary Examiner*—Michael S. Marcus
*Attorney, Agent, or Firm*—Donald E. Degling

[57] ABSTRACT

A method and apparatus for visually monitoring the fluidized bed of a resin ion exchanger. The method includes establishing a sample fluidized bed displaced from, but in fluid communication with, the resin ion exchanger fluidized bed and supplying a quantity of exchanger process solution in a controlled manner to the sample fluidized bed such that the sample fluidized bed represents among other exchanger fluidized bed characteristics the exchanger fluidized bed height. The apparatus includes a monitor having a transparent sampling column in fluid communication with the exchanger fluidized bed and a regulator in fluid communication with the exchanger and the sample column for establishing a solution sample for supply to the sample fluidized bed. The regulator includes an orifice for controlling the flow rate of solution sample supplied to the sample fluidized bed.

10 Claims, 3 Drawing Figures

APPARATUS AND METHOD FOR VISUALLY MONITORING AN ION EXCHANGE FLUIDIZED BED

This invention relates generally to apparatus and method for monitoring the recovery of minerals from a mineral bearing solution. More specifically this invention relates to apparatus and method for visually monitoring an ion exchange fluidized bed.

BACKGROUND

Many metals and their compounds are soluble in acidic and basic solutions. Accordingly, many metal recovery processes use an acidic or basic solution, typically called a leach solution, for generating a mineral bearing solution which will subsequently yield the desired metal.

In these processes, the mineral bearing leach solution typically requires further concentration and purification before a final product can be obtained. A major technique used for this purpose is resin ion exchange. As an example, resin ion exchange is used in uranium recovery. In uranium recovery, use of resin ion exchange is based on the existence of anionic uranium complexes in the leach solution. Under correct conditions, the anionic uranium complexes can be selectively removed by a preferentially absorbing synthetic resin. Following resin absorption, a suitable eluting reagent can be used to strip the uranium complexes from the resin, thereby yielding a purified and concentrated solution. Subsequently, precipitation techniques are available to produce a final product.

Resin ion exchange apparatus typically includes one or more preferentially absorbing resin beds and means for alternately combining the resin with a series of solutions, e.g., a mineral bearing leach solution, a wash solution or drainage and an eluting solution. In the exchange apparatus, the resin extracts the mineral from the mineral bearing solution in a fluidized bed established when the solution and resin are combined. Subsequently, the eluting solution strips the mineral from the resin in a fluidized bed established when the eluting solution and resin are combined. Depending upon the mineral concentration in the eluting solution, the eluting solution may either be further concentrated and purified or processed for the removal of the final product.

To maintain exchanger efficiency, equipment operators find it desirable to monitor various characteristics of the resin ion exchange column. For example, operators find it desirable to monitor such characteristics as fluidized bed height; accumulation of foreign matter in the bed; solution clarity; resin color; and resin breakage.

By monitoring bed height, the operator is able to check solution velocity and avoid resin bed depletion. Specifically, solution flow through the fluidized bed causes the bed to expand, the greater the solution velocity through the bed, the higher the fluidized bed height. If left unchecked, excess solution velocity could cause the bed to rise sufficiently to push resin out of the chamber.

Foreign matter in the fluidized bed can clog the apparatus and disrupt solution flow. Therefore, it is important that foreign matter be detected and removed. This is especially true for recovery process which leach scrap materials such as tin cans, as these processes are likely to produce foreign matter of every type which can clog the apparatus.

Observation of resin color advises the operator of the extent to which the resin has realized its maximum absorption. Accordingly, resin color gives the operator some notice of the quality and quantity of resin absorption.

Finally by being aware of resin breakage, the operator is able to determine whether the process is proceeding properly. In normal operation, resin breakage typically does not occur. Accordingly, appearance of significant amounts of broken resin suggests some problem in the process. Further, the monitoring of resin breakage advises the operator of the extent to which the resin bed is being depleted.

In the past, it has not been possible to directly observe a commercially sized fluidized bed. While in small scale laboratory apparatus, one can construct the exchanger vessel from transparent material, permitting direct operator observation of fluidized bed parameters, this is not possible in commercially sized apparatus. Unlike smaller laboratory apparatus, full size commercial columns contain large amounts of resin and solution creating substantial forces on the vessel walls. Commercially sized vessels, therefore, must be made of materials sufficiently strong to withstand these forces. Transparent materials such as glass and plexiglas, while of sufficient strength for laboratory apparatus are of insufficient strength to handle the loading in full size commercial columns. Rather, high strength materials such as stainless steel must be used for commercial sized vessel walls. Accordingly, the operator is denied visual observation of the fluidized bed.

While equipment has been developed which attempts to automatically monitor certain parameters of a commercially sized fluidized bed, such apparatus has proven to be insensitive to various column characteristics. For example, photoelectric cells have been used in commercially sized apparatus to detect the fluidized resin bed-solution interface. Unfortunately however, such sensors are unable to detect the difference between resin and foreign matter and therefore are unable to detect foreign matter in the bed. This failure is of particular importance in mineral recovery from scrap materials where significant amounts of foreign matter are likely. Additionally, such automatic monitoring apparatus tends to be expensive and complicated to use.

Accordingly, it is an object of my invention to provide apparatus and method for visually monitoring an ion exchange fluidized bed.

It is a further objective of my invention to provide apparatus and method which permits the visual monitoring of various fluidized bed characteristics such as fluidized bed height, presence of foreign matter, resin color, resin breakage, and solution clarity.

It is yet a further objective of my invention to provide apparatus and method for visually monitoring a fluidized bed which is inexpensive to make and simple to use.

SUMMARY OF INVENTION

My invention is directed to apparatus and method for accomplishing the above and other objectives. The method of my invention includes establishing a visually observable sample fluidized bed displaced from, but in fluid communication with, the exchanger fluidized bed. The method provides that the fluidized bed resin be permitted to transfer between the exchanger fluidized bed and the sample fluidized bed. Additionally, the method includes diverting a sample of exchanger process solution, for introduction to the sample fluidized bed so that conditions within the sample bed substantially represent the conditions within the exchanger bed. The method further includes introducing a process solution sample to the sample bed at a controlled flow rate such that the velocity of the sample solution through the sample bed causes the sample fluidized bed height to be representative of the exchanger fluidized bed height.

The apparatus of my invention principally includes a sample column for containing a sample fluidized bed having a transparent cylindrical gauge element and conduits for fluidly coupling the gauge element to the exchanger. The exchanger, transparent gauge element and conduits are arranged in fluid communication to permit resin transfer between the exchanger fluidized bed and the sample fluidized bed. The apparatus further includes a regulator in fluid communication with the exchanger and sample column for diverting process solution from the exchanger to establish a process solution sample for delivering to the sample column. The regulator further includes an orifice for controlling the solution sample flow rate so that sample solution may be introduced to the sample bed at a controlled velocity.

In a preferred form, the sample column and regulator are arranged such that the flow rate of the process solution sample gives rise to a solution velocity through the sample fluidized bed which substantially equals the solution velocity through the exchanger fluidized bed, causing the exchanger fluidized bed height and the sample fluidized bed height to be substantially equal. In preferred form, shut off valves are provided in the conduits coupling the gauge element and the regulator to the exchanger. The valves enable interruption of fluid communication and removal of the gauge element and regulator from the exchanger. Further, in preferred form valves and a drain conduit are provided which serves to avoid resin blockage of the regulator orifice and permit clearing of any clogging that may arise.

DESCRIPTION OF THE DRAWINGS

Further objectives, advantages and features of my invention will become apparent from the following detailed description considered in conjunction with the accompanying figures, in which.

DESCRIPTION OF PREFERRED EMBODIMENT

As those skilled in the art will appreciate, the monitoring apparatus and method of my invention are intended for use with a variety of resin ion exchangers. In the following description, I have chosen, for the sake of clarity, to describe the features and advantages of my invention in combination with the uranium resin ion exchanger. It however should not be assumed that my invention is limited to use only with only a uranium exchanger.

THE EXCHANGER

Typically, a uranium resin ion exchanger includes a containment vessel having one or more beds of uranium complex absorbing resin combined with a process solution to define one or more fluidized beds. The apparatus is typically further provided with pump and conduit means for pumping the various process solutions through the exchanger.

Figure 1:
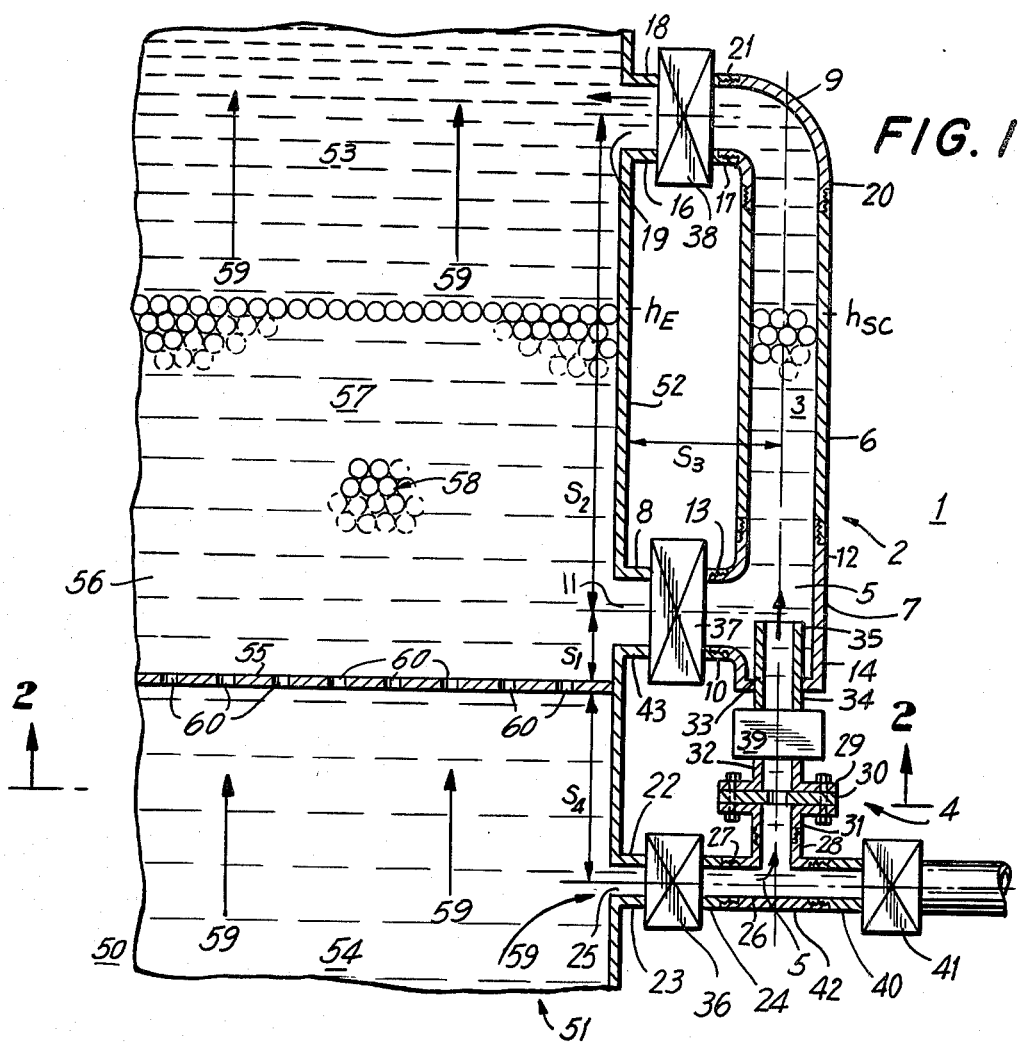
FIG. 1 is a side cross section view of a portion of the ion exchanger and fluidized bed combined with the monitoring apparatus of my invention.
Figure 2:
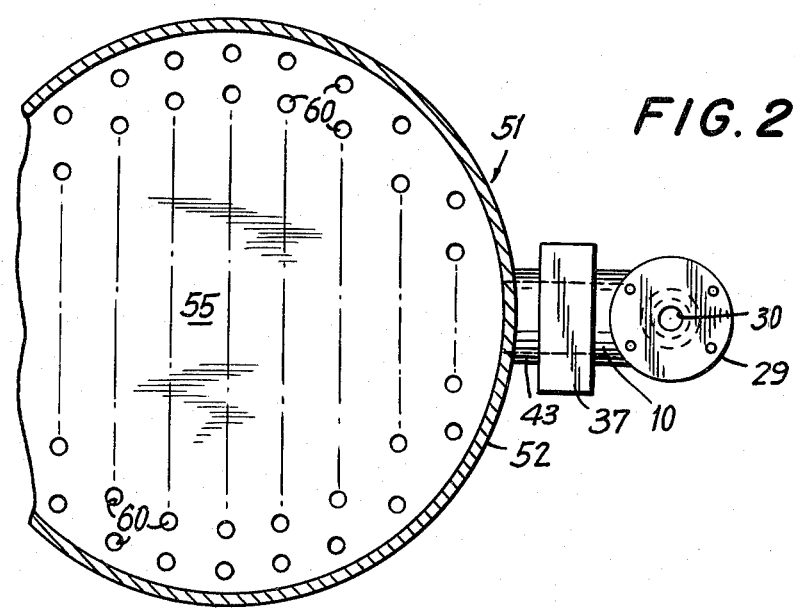
FIG. 2 is a sectional view of the exchanger and the monitoring apparatus of my invention taken along line 2—2 of FIG. 1.

FIG. 1 shows the monitoring apparatus 1 of my invention in combination with a portion of a uranium ion exchanger 50 in the region of an exchanger fluidized bed 57. The exchanger 50 includes a cylindrical containment vessel 51 having a major length axis. An external vessel wall 52 defines vessel 51's outer perimeter. Vessel 51 is oriented with its major axis in the vertical direction, thereby defining an upper vessel region 53 and a lower vessel region 54. Within vessel 51, a distributor plate 55 defines a fluidized bed chamber 56 in upper vessel region 53. As shown in FIG. 2, plate 55 is planar and has a pattern of perforations in the form of multiple holes 60. As shown in FIG. 1, holes 60 extend through plate 55 and permit fluid flow therethrough. Plate 55 is located in vessel 51 in a plane perpendicular to vessel 51's major length axis, and parallel to vessel 51's cross section.

A charge of resin 58, selectively absorbent of the mineral to be removed, in this case uranium complexes, is provided in vessel 51 at chamber 56. Standard pump and conduit means, not shown, supply a process solution 59 to vessel 51. Process solution 59 is pumped in a vertical direction from lower vessel region 54 through distributor plate 55 and resin 58 to upper vessel region 53. The process solution 59 combines with resin 58 in chamber 56 to form a fluidized bed 57 having a height $h_E$.

Depending upon the chamber type and exchanger cycle, process solution 59 can be a mineral bearing solution, a wash solution, or an eluting solution. As shown in FIG. 1, the process solution 59 being supplied is a uranium bearing solution. Therefore, chamber 56 is a resin charging chamber in which the resin is in an absorbing cycle.

The interaction of solution 59 and resin 58 follows the usual rules controlling fluids. In accordance with well known principles of fluid dynamics, the velocity of solution 59 in fluidized bed 57 is principally determined by such factors as the ratio of the distributor plate total hole cross section to the exchanger cross section; the solution pressure in region 54; and solution flow rate in region 54. The pressure drop across the fluidized bed 57 is also determined in accordance with the principles of fluid dynamics. The solution flow rate and the flow resistance of the bed are the principal factors determining fluidized bed pressure drop. Resin bead characteristics such as specific gravity and geometry and the quantity of resin in the chamber are the principal factors controlling bed flow resistance. In normal operation, as solution 59 is pumped through resin 58, fluidized bed 57 rises in height, e.g. $h_E$, as a function of solution velocity until an equilibrium is reached between the action of solution 59 to transport the resin 58 vertically in bed 57 and the action of resin weight to cause the resin 58 to settle (fall) in bed 57. At equilibrium, the pressure drop and bed height for a particular resin charge and solution velocity are established.

THE MONITOR

FIG. 1 shows monitor 1 of my invention. As shown in FIG. 1, monitor 1 includes a sample column 2 for establishing a visible sample fluidized bed 3 representative of the exchanger fluidized bed 57. Monitor 1 further includes a solution sample regulator 4 for diverting a sample 5 of exchanger solution 59 to sample column 2 at a controlled flow rate.

Among the principal advantages of my apparatus is its ability to establish a visible sample fluidized bed 3 which represents the prevailing conditions within an operating companion exchanger fluidized bed 57. For example, my monitor is able to represent bed height, foreign matter, solution clarity, resin color and resin breakage in exchanger fluidized bed 57.

My apparatus is able to achieve this result by employing a sample column 2 sufficiently small in size to permit use of a transparent material and by locating sample column 2 externally to the exchanger fluidized bed 57. My apparatus is able to establish a sample fluidized bed 3 representative of the exchanger fluidized bed 57 by maintaining sample fluidized bed 3 in fluid communication with exchanger fluidized bed 57 thereby permitting resin 58 exchange between the sample and exchanger fluidized beds 3 and 57, respectively. Further, my apparatus uses a regulator 4 which samples exchanger process solution 59 to establish a solution sample before process solution 59 enters exchanger fluidized bed 57. By sampling solution 59 in this way, my regulator 4 is able to simply and efficiently control the flow rate of solution sample supplied to sample column 2, with a control orifice 30 of predetermined cross section such that sample fluidized bed height $h_{sc}$ is representative of the exchanger fluidized bed height $h_E$.

SAMPLE COLUMN

As shown in FIG. 1, sample column 2 includes a sample column gauge element 6, a gauge element inlet coupling 7, a resin transfer conduit 8, a gauge element outlet coupling 9, and a return conduit 18.

In order to permit simple and rapid monitoring of sample fluidized bed 3 in monitor 1, element 6 is provided with a wall at least a portion of which is made of a transparent material such as glass or plexiglas. If desired, the entire element 6 may be transparent. In a preferred form of the invention, element 6 is cylindrical in shape to permit ease of reading from various perspectives. Gauge elements 6's cross sectional area can be any convenient size provided it is sufficiently large to avoid unacceptable error in representations of fluidized bed height as is discussed in more detail below. Further, the gauge element cross section should be small enough to avoid excess stress on gauge element 6 due to sample fluidized bed weight.

As shown in FIG. 1, sample column 2 includes a transfer conduit 8 having an exchanger end 43 and a gauge end 10. Transfer conduit exchange end 43 is connected in sealing relation in a conventional manner to an exchanger transfer port 11 located in vessel wall 52. Vessel transfer port 11 is located in vessel wall 52 in communication with fluidized bed 57 in chamber 56, at a predetermined height $S_1$ above distributor plate 55.

As described and as shown in FIG. 1, sample column 2 further includes an inlet coupling 7 having a gauge element coupling port 12, a transfer conduit coupling port 13 and a regulator coupling port 14. Port 12 is connected in sealing relation to the lower end of gauge element 6. Port 13 is connected in sealing relation with transfer conduit end 10. Finally, port 14 is connected in sealing relation with regulator 4. Any convenient technique may be used to effect the sealing connections at the respective ports.

Sample column 2 also includes a return conduit 18 having an exchanger end 16 and a gauge end 17. Return conduit end 16 is connected in sealing relation to an exchanger return port 19 located in vessel wall 52. Return port 19 is located in vessel wall 52 in communication with vessel upper region 53 at a predetermined distance $S_2$ above the exchanger port 11. Further, the height of the vessel return port 19 is selected to be above the maximum operating height of the vessel fluidized bed 57.

Sample column 2 finally includes a gauge element outlet coupling 9 having a gauge element coupling port 20 and a return conduit outlet coupling port 21. Coupling port 20 is connected in sealing relation to the upper end of gauge element 6. Further, outlet coupling port 21 is connected in sealing relation with return conduit end 17. As in the case of coupling 7, any convenient technique may be used to effect the sealing connections at the respective ports of coupling 9.

With sampling column 2 connected as described above, the sampling column 2 and sample fluidized bed 3 are in fluid communication with exchanger 50 and exchanger fluidized bed 57. Accordingly, resin 58 may transfer between exchanger fluidized bed 57 and the sample column fluidized bed 3 by means of transfer conduit 8, as will be further described hereinafter.

While sample column gauge element 6 may be oriented in any convenient manner permitting operation, in preferred form, I orient sample column gauge element 6 with its major length axis displaced a distance $S_3$ from, but substantially parallel to the exchanger major axis. Transfer conduit 8 is connected to exchanger wall 52 with its major length axis perpendicular to the exchanger major axis. Additionally, conduit 8 is connected to inlet coupling 7 such that transfer conduit 8's major axis is perpendicular to gauge element 6's major axis. Further, return conduit 18 is coupled to exchanger wall 52 with its major length axis perpendicular to the exchanger's major axis and to outlet coupling 9 such that the return conduit's major axis is perpendicular to gauge elements 6's major axis.

Also in preferred form, the cross section of transfer conduit 8, return conduit 18 and their respective couplings 7 and 9 are the same and equal to the cross section of gauge element 6. Additionally, like gauge element 6, the conduits and couplings are cylindrical in the preferred form. The conduits and couplings may be made of materials such as polyvinyl chloride, stainless steel, or other materials resistant to the corrosive effects of the fluidized bed constituents.

THE REGULATOR

Regulator 4 of my monitor 1 includes a regulator inlet sampling conduit 22, a regulator inlet coupling 26, a regulator orifice plate 29 and a regulator outlet conduit 33. As shown in FIG. 1, regulator 4 includes an inlet sampling conduit 22 having an exchanger end 23 and a guage end 24. Inlet conduit end 23 is connected in sealing relation to an exchanger solution outlet port 25 located in the vessel wall 52. Outlet port 25 is located in proximity to vessel lower region 54 at a predetermined distance $S_4$ below vessel distributor plate 55. Inlet conduit 22 is provided with a sufficient cross section to divert a quantity of exchanger solution 59 from the lower vessel region 54 for use in establishing an exchange solution sample 5. Since solution sample 5 will ultimately to be supplied to sample column 2, the quantity of solution must be sufficient for sample column 2's operation as described above and as to be described below. Regulator 4 also includes an inlet coupling 26 having an inlet conduit coupling port 27 and an orifice coupling port 28. Inlet conduit end 24 is connected to coupling 26 at port 27.

Regulator 4 further includes an orifice plate 29 having an inlet 31 of predetermined cross section and an outlet 32 of predetermined cross section. Further, orifice plate 29 has an internal predetermined orifice 30 of smaller area than that of inlet 31 or outlet 32, as shown in FIG. 2, for regulating the flow rate of solution sample 5. As is well known in the art of fluid dynamics, by varying the orifice cross section the flow rate through the orifice may be regulated. As shown in FIG. 1, orifice plate inlet 31 is connected in sealing relation to coupling port 28 for supplying solution sample 5 to orifice plate 29.

Finally, as shown in FIG. 1, regulator 4 includes a regulator outlet conduit 33 having a regulator conduit end 34 and a sample column conduit end 35. Conduit end 34 is connected in sealing relation to orifice outlet 32 and conduit end 35 is connected in sealing relation to sample column inlet coupling 7 at port 14. Further, as shown in FIG. 1, regulator conduit end 35 is located within coupling 7 in the region of transfer coupling port 13 so that sample solution is directed toward gauge element 6. As in the case of sample column 2's sealing connections, all regulator 4's sealing connections are made in a conventional manner.

With regulator 4 arranged as described above, a quantity of exchanger solution 59 in vessel lower region 54 is diverted by conduit 22 to establish an exchanger solution sample 5. The regulator orifice plate 29 controls solution sample flow such that regulator 4 maintains a predetermined solution sample velocity in sample column 2 whereby sample fluidized bed height $h_{sc}$ represents exchanger fluidized bed height $h_E$.

While regulator inlet conduit 22 may be oriented in any convenient manner permitting operation, in a preferred form, I orient regulator inlet conduit 22 with its major length axis perpendicular to the exchanger major length axis. Regulator coupling 26, orthogonally couples orifice plate 29 to regulator inlet conduit 22. Additionally, the orifice major length axis and the regulator outlet conduit major length axis are aligned with each other and with the major length axis of sample column 2. Further in preferred form, the orifice 30 of orifice plate 29 is selected such that the ratio of orifice 30's cross section to sample column gauge element 6's cross section is equal to the ratio of the distributor plate total hole cross section to the exchanger cross section. With orifice 30 so selected, regulator 4 adjusts the flow rate of the solution sample 5 such that the velocity of solution sample 5 in sample fluidized bed 3 is equal to velocity of solution 59 in fluidized bed 57. Further, the cross section of inlet conduit 22 is selected such that it does not significantly affect orifice plate 29's control of solution sample 5's flow rate.

As shown in FIG. 1, my monitor 1 may also include valves for isolating sample column 2 and regulator 4 from vessel 51 to permit monitor 1's removal. Accordingly, an "on-off" ball valve 36 is located in regulator inlet conduit 22 for interrupting fluid communication between lower vessel region 54 and regulator orifice plate 29. Further, "on-off" gate valves 37 and 38 are respectively placed in transfer conduit 8 and return conduit 18 for respectively interrupting fluid communication between exchanger fluidized bed 57, vessel upper region 53 and sample gauge element 6.

Additionally, in order to prevent clogging of orifice 29 when fluid flow in regulator 4 is interrupted, a check valve 39 is provided in outlet conduit 33 between regulator orifice plate 29 and sample column inlet coupling 7. Finally, to permit draining of orifice plate 29 and sample column gauge element 6, regulator 4 is provided with a drain conduit 40 and ball valve 41 connected to a drain port 42 in regulator inlet coupling 26. With this arrangement, solution may be drained from gauge element 6, or pressure may be supplied through conduit 40 to clear blockage in orifice 30.

OPERATION

With reference to FIG. 1, operation of my monitor 1 is as follows. Initially, valves 36, 37 and 38 are closed isolating my monitor 1 from the exchanger 50. Accordingly, gauge element 6 is empty. In this condition, process solution 59 flows in fluidized bed 57 at a velocity determined by such factors as the ratio of distributor plate hole area to exchange vessel cross sectional area; solution pressure and solution flow in lower vessel region 54. Accordingly, a pressure drop is established across the fluidized bed 57 and the fluidized bed assumes a height $h_E$. When valves 36, 37 and 38 are opened, exchanger solution sample 5 begins to flow in regulator 4. Further, solution sample 5 flows through control orifice 29, to establish a solution sample velocity in gauge element 6. Inasmuch as no resin is within gauge element 6, (it was initially empty), there is little or no pressure drop across the sample fluidized bed 3. Accordingly, a pressure differential exists across the transfer conduit 8. As a result, resin is transferred toward the lower pressure, from exchanger fluidized bed 57 through transfer conduit 8 to establish sample fluidized bed 3 in gauge element 6. This transfer process continues until sufficient resin has transferred from fluidized bed 57 to sample fluidized bed 3 to reduce the pressure drop across conduit 8 substantially to zero. When an equilibrium condition is established, the height $h_{sc}$ of the sample fluidized bed will be representative of the height of the fluidized bed $h_E$ in the exchanger.

If gauge element 6 contains resin initially, and if the pressure drop across sample bed 3 exceeds the pressure drop across exchanger bed 57, resin will be transferred to the exchanger fluidized bed 57. Further, if during operation, the pressure drop across bed 3 and bed 57 differ, resin will be transferred accordingly.

In a preferred form of my apparatus, by adjusting the cross section of orifice 30, I maintain the velocity of solution sample 5 in bed 3 equal to the velocity of solution 59 in bed 57 with the result that sample fluidized bed height $h_{sc}$ is substantially equal to exchanger bed height $h_E$.

Also in the preferred form, to assure reasonably prompt stabilization, I select transfer conduit 8 to be as short as conveniently possible, i.e. minimal distance $S_3$, to avoid pressure drop due to movement of resin from exchanger bed 57 to sample bed 3. Pressure drop due to resin movement through conduit 8 serves to reduce the pressure at sample bed 3 while resin is being transferred. Accordingly, pressure drop due to resin movement through conduit 8 slows stabilization. Additionally, in the preferred form I locate conduit 8 as close to distributor plate 55 as conveniently possible, i.e. minimal distance $S_1$ to permit reading of low exchanger fluidized bed heights. Further, to discourage clogging of transfer conduit 8, I select the resin specific gravity to be of the same order of magnitude as the process solution. Use of a resin having a specific gravity on the order of that of the solution discourages resin settling in conduit 8 at low pressure differentials and associated low transfer rates.

Figure 3:
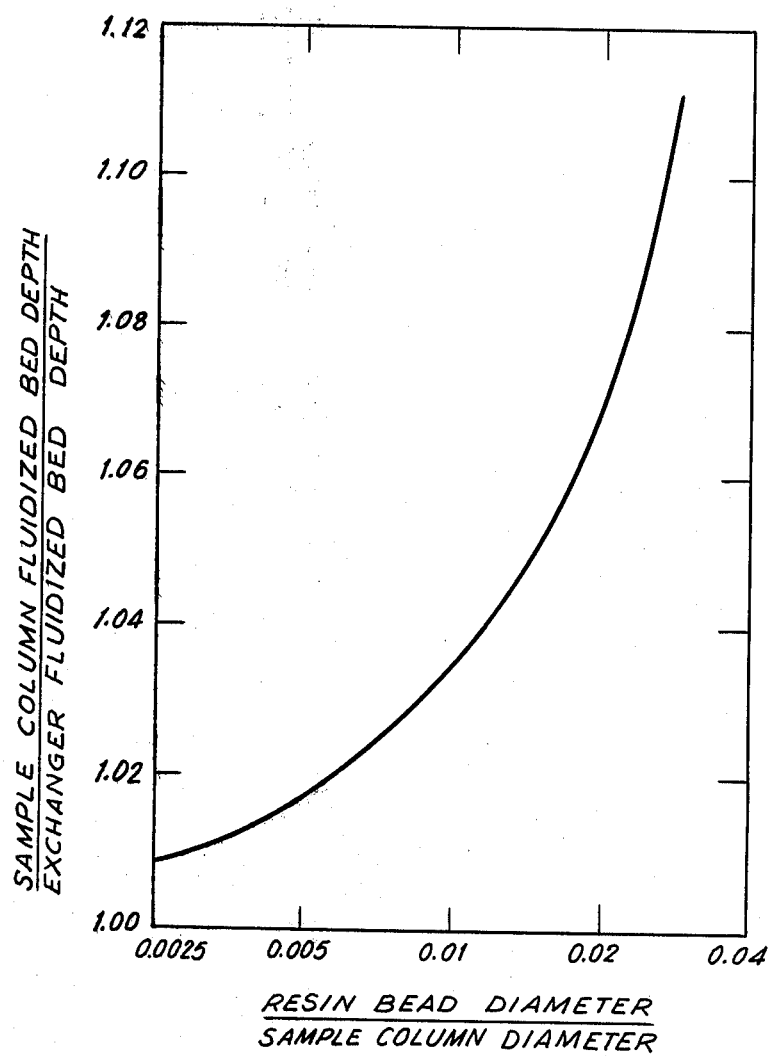
FIG. 3 is a sample column fluidized bed height correction curve for various ratios of resin bead diameter to sample column diameter, in accordance with my invention.

As noted above, the cross-sectional area of the sample column gauge element 6 must be sufficiently large with respect to the characteristics of the fluidized bed to avoid effects arising from interaction of the resin, and solution with the gauge element walls. Particularly, the diameter of gauge element 6 must be substantially larger than the diameter of the resin beads. If a sufficient ratio is not maintained, a correction factor must be applied to the sample fluidized bed height indication $h_{sc}$ to determine the exact exchanger fluidized bed height $h_E$. Bed height measurements for known gauge element diameters and resin diameters provide a correction curve as shown in FIG. 3.

EXAMPLE

A preferred form of the monitoring apparatus was used to monitor a commercial uranium ion exchanger. The commercial column parameters were as follows: column inside diameter 8 feet; resin compartment height 9 feet; ratio of distributor plate hole area to column cross sectional area 0.01; resin, a 150 cubic feet of 14-16 mesh Rohm and Haas IRA-430; and an exchanger mineral bearing solution of cementation plant tail water at a flow rate of 500 gallons per minute. The monitor used with the described commercial column had the following features: a three inch diameter plexiglas sample gauge element 6; 7 feet and $1\frac{1}{2}$ inches between centers of a 3 inch diameter transfer conduit 8 and 3 inch diameter return conduit 18; 10 inches from the vessel wall 52 to the center line of sample column 2; a three inch polyvinyl chloride inlet coupling TEE; a three inch polyvinyl chloride outlet coupling ELL; a regulator inlet conduit 22 of one inch diameter, and an orifice diameter of 0.31 inches.

As arranged, the sample column indicated a fluidized bed height of 5 feet 3 inches for an exchanger fluidized bed height of 5 feet.

METHOD

The method aspects of my invention include a series of steps which permit the operator of a commercial resin ion exchanger, as for example the uranium resin ion exchanger described above, to visually observe the conditions existing within the fluidized bed during operation. The conditions which an operator may observe using my bed method would include fluidized bed height, accumulation of foreign matter in the bed, process solution clarity, resin color and resin breakage.

Specifically, my method for observing the fluidized bed characteristics includes first establishing a visually observable sample fluidized bed displaced from the exchanger fluidized bed which is maintained in fluid communication with the exchanger fluidized bed such that bed resin may be transferred between exchanger fluidized bed and the sample fluidized bed. As described with respect to my apparatus, this may be accomplished with the use of a transparent sampling column fluidly coupled to the exchanger vessel and exchanger fluidized bed by means of appropriate conduits.

My method next requires that a sample of process solution flowing in the exchanger be diverted to establish a solution sample for delivery to the sample fluidized bed. In the preferred form, I recommend the exchanger solution sample be diverted from the exchanger before the solution enters the exchanger fluidized bed. In this way the solution sample flow rate may be more readily controlled as explained with respect to my apparatus.

Following the establishment of a solution sample my method includes passing the sample through predetermined orifice to establish a predetermined flow rate for the solution. As described with respect to the apparatus of my invention, this step may be readily facilitated by using an orifice in fluid communication with the solution sampling conduit.

Following the establishment of the solution sample at a predetermined flow rate, my method includes supply of the sample to the sample fluidized bed such that sample solution velocity through the sample fluidized bed gives rise to a fluidized bed height substantially representative of the fluidized bed height in the exchanger.

Following flow of the solution sample through the sample fluidized bed, my method requires returning the sample solution to the exchanger. In my method, the sample solution is returned to the exchanger at a point above the exchanger fluidized bed height.

Finally, in preferred form, my method would require that the orifice cross-sectional area be predetermined to establish a solution sample flow rate which gives rise to sample solution velocity in the sample fluidized bed which is substantially equal to velocity of solution in the exchanger fluidized bed whereby the height of the sample fluidized bed is substantially equal to the height of the exchanger fluidized bed.

While I have described the apparatus and method of my invention in a particular embodiment it will be understood that various additions, substitution, modifications and omissions may be made to my invention without departing from its true spirit.

What I claim is:

1. Apparatus for monitoring a fluidized bed in a resin ion exchanger, the exchanger having a chamber and a source of process solution connected to the chamber, the chamber containing the fluidized bed which includes preferentially absorbing resin and process solution supplied to the chamber from the source, the apparatus comprising:

(a) a sample column having a wall at least a portion of which is transparent, a resin transfer conduit adapted to be connected to the exchanger to fluidly couple the column to the exchanger fluidized bed for enabling resin transfer between the exchanger and sample column fluidized bed, a solution sample inlet for receiving a process solution sample for supply to the column, and a solution sample outlet conduit adapted to be connected to the exchanger to fluidly couple the column to the exchanger for enabling return of the solution sample to the exchanger after the solution sample has passed through the column such that a sample fluidized bed is established in the column, at least a portion of which is visible; and (b) a regulator having an inlet conduit adapted to be connected to the exchanger to fluidly couple the regulator to the exchanger process solution source to divert a quantity of process solution before it enters the exchanger fluidized bed for establishing the process solution sample, an orifice in fluid communication with the regulator inlet conduit for regulating the solution sample flow rate, and a regulator outlet conduit connected to the sample column inlet to fluidly couple the regulator orifice to the sample column for supplying the process solution sample at a controlled flow rate to the sample column such that the sample column fluidized bed height is visually monitorable and representative of the exchanger fluidized bed height.

2. The apparatus of claim 1 in which the regulator orifice cross-sectional area is selected to establish a solution sample flow rate which renders the sample solution velocity through the sample fluidized bed substantially equal to the process solution velocity through the exchanger fluidized bed, whereby the exchanger fluidized bed height and the sample column fluidized bed height are substantially equal.

3. The apparatus of claim 2 in which the regulator inlet conduit, the sample column resin transfer conduit and the sample column outlet conduit further include a shutoff valve for interrupting fluid flow and permitting removal of the sample column and regulator from the exchanger.

4. The apparatus of claim 3 in which the regulator further includes a check valve connected between the regulator outlet conduit and the regulator orifice to prevent sample column resin from clogging the orifice when the solution sample is not flowing through the orifice.

5. The apparatus of claim 4 in which the regulator further includes a vent conduit and a shutoff valve in fluid communication with the orifice to permit clearing of the orifice when clogged.

6. Apparatus for monitoring a fluidized bed in a resin ion exchanger, the exchanger including a walled container, divided into at least two regions by a perforated distributor plate, at least one region defining a chamber containing a preferentially absorbing resin and a process solution defining the fluidized bed and at least one other region containing the process solution for supply to the chamber, the apparatus comprising:

a. a sample column having a cylindrical gauge element with an upper and lower end and a predetermined cross sectional area, at least a part of the cylinder being made of a transparent material; a resin transfer conduit with two ends, one transfer conduit end adapted to be connected to the exchanger container wall, in fluid communication with the exchanger fluidized bed and the other transfer conduit end being coupled to the cylindrical column element lower end for permitting resin exchange between the exchanger and the gauge column; an inlet at the cylindrical column lower coupling end for recovering solution sample; an outlet conduit with two ends, one outlet conduit end adapted to be connected to the exchanger, above the exchanger fluidized bed in fluid communication with the exchanger, and the other outlet conduit end being coupled to the sample column's upper end, whereby a visually observable sample fluidized bed may be established in the cylindrical column; and b. a regulator having an inlet conduit with two ends, one inlet conduit end adapted to be connected to the exchanger container wall, in fluid communication with the exchanger process solution before the process solution enters the exchanger fluidized bed for diverting a quantity of solution form the exchanger to establish a solution sample; an orifice coupled to the other inlet conduit end in fluid communication with the inlet conduit for establishing a predetermined flow rate for the solution sample passing through the orifice; and an outlet conduit with two ends, one end being connected to the orifice in fluid communication therewith and the other outlet end being coupled to the sample column gauge element coupling end in fluid communication therewith for supplying solution sample to the cylindrical element at a predetermined rate, whereby the height of the observable sample fluidized bed established in the sample column is representative of the exchanger fluidized bed height.

7. The apparatus of claim 6 in which the orifice cross-sectional area is substantially equal to the product of the sample column cross-sectional area and the exchanger distributor plate total perforation cross-sectional area, the product divided by the exchanger cross sectional area, so that the process solution velocity through the exchanger fluidized bed is substantially equal to the solution sample velocity through the sample column fluidized bed whereby the respective fluidized beds in the exchanger and sample column are substantially equal in height.

8. The apparatus in claim 7 in which the regulator inlet conduit, the sample column resin transfer conduit and the sample column return conduit each include a shutoff valve for interrupting fluid flow to isolate the exchanger from the sample column and regulator.

9. The apparatus of claim 8 in which the regulator further includes a check valve connected between the regulator orifice and the regulator outlet conduit to prevent sample column resin from clogging the orifice when solution sample is not flowing through the orifice.

10. The apparatus of claim 9 in which the regulator further includes a vent conduit and shutoff valve in fluid communication with the orifice for permitting clearing of the regulator orifice when clogged.

* * * * *

UNITED STATES PATENT AND TRADEMARK OFFICE
CERTIFICATE OF CORRECTION

PATENT NO. : 4,298,466
DATED : November 3, 1981
INVENTOR(S) : Donald P. Satchell, Jr.

It is certified that error appears in the above—identified patent and that said Letters Patent is hereby corrected as shown below:

Column 12, line 2, "recovering" should be -- receiving --.

Signed and Sealed this

Twenty-seventh Day of April 1982

[SEAL]

Attest:

GERALD J. MOSSINGHOFF

Attesting Officer

Commissioner of Patents and Trademarks